United States Patent [19]

Mitsuo

[11] Patent Number: 5,757,902
[45] Date of Patent: May 26, 1998

[54] TELEPHONE EXCHANGE FOR WIRE TELEPHONE AND RADIO TELEPHONE

[75] Inventor: Sadaka Mitsuo, Kasuga, Japan

[73] Assignee: Matsushita Electric Industrial Co., Ltd., Osaka, Japan

[21] Appl. No.: 574,339

[22] Filed: Dec. 18, 1995

[30] Foreign Application Priority Data

Jan. 27, 1995 [JP] Japan .................. 7-011749

[51] Int. Cl.$^6$ .......................... H04M 3/42; H04M 11/00
[52] U.S. Cl. .................. 379/212; 455/417; 455/462; 455/555
[58] Field of Search ................. 379/58, 61, 210, 379/211, 212; 455/74.1, 414, 417, 462, 567, 555

[56] References Cited

U.S. PATENT DOCUMENTS

| | | | |
|---|---|---|---|
| 4,980,907 | 12/1990 | Raith et al. | 379/210 X |
| 5,222,123 | 6/1993 | Brown et al. | 379/210 X |
| 5,327,486 | 7/1994 | Wolff et al. | 379/210 X |
| 5,390,233 | 2/1995 | Jensen et al. | 455/417 |
| 5,400,327 | 3/1995 | Dezonno | 379/210 X |
| 5,454,032 | 9/1995 | Pinard et al. | 455/445 X |

FOREIGN PATENT DOCUMENTS

| | | | |
|---|---|---|---|
| 2122778 | 11/1994 | Canada. | |
| 0312494 | 12/1990 | Japan | 455/417 |
| 3-151796A | 6/1991 | Japan | 455/417 |

*Primary Examiner*—Harry S. Hong
*Attorney, Agent, or Firm*—Watson Cole Stevens Davis, P.L.L.C.

[57] ABSTRACT

This invention is to provide a telephone exchange capable of operating any one of the juxtaposed and registered extension radiotelephones and wire telephones by only specifying one extension dial number. For this purpose, a wire port physical number is registered in association with a radio port physical number so that two normally separate extension wire telephone (006a, 006b, ...) and radiotelephone (008a, 008b, ...) can be handled as if they were a single-channel extension phone with a branch switch. Thus, when the user handles two separate radio telephone and wire telephone, the call to the wire telephone can be transferred to the radiotelephone by a simple operation. When the user leaves his desk on which the wire telephone is installed, carrying the radiotelephone with him, it can be carried to a long distance. In addition, two telephones can be used as if they are connected in parallel, and for example, the telephone conversation between a main line and the radiotelephone can be transferred to the wire telephone.

1 Claim, 17 Drawing Sheets

FIG.2

| EXTENSION PHYSICAL NUMBER | EXTENSION DIAL NUMBER |
|---|---|
| #000 | 301 |
| #001 | 302 |
| #002 | 303 |
| #003 | 304 |
| ⋮ | ⋮ |
| #015 | 401 |
| #016 | 402 |
| #017 | 403 |
| ⋮ | ⋮ |
| #024 | 409 |

EXTENSION PORTS FOR RADIO TELEPHONES (#000–#015)

EXTENSION PORTS FOR WIRE TELEPHONES (#016–#024)

FIG.3

| EXTENSION PHYSICAL NUMBER | JUXTAPOSED AND REGISTERED EXTENSION PHYSICAL NUMBER | |
|---|---|---|
| #000 | #016 | [RADIOTELEPHONE008a] |
| #001 | | [RADIOTELEPHONE008b] |
| #002 | #024 | [RADIOTELEPHONE008c] |
| #003 | | [RADIOTELEPHONE008d] |
| ------ | | |
| #015 | | [RADIOTELEPHONE008o] |

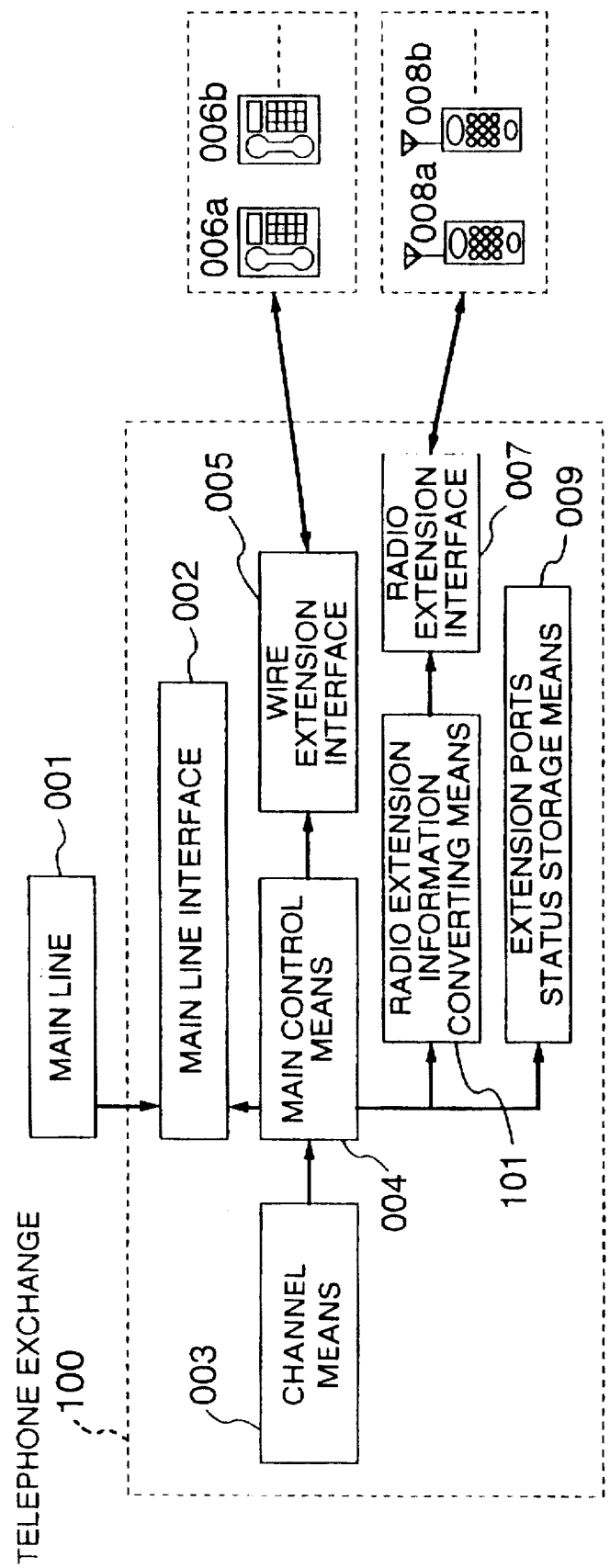

111: WIRE EVENT FORMAT
(WIRE TELEPHONE(006)→WIRE EXTENSION INTERFACE(005)→MAIN CONTROL MEANS(004))

112: RADIO EVENT FORMAT
(RADIO TELEPHONE(008)→RADIO EXTENSION INTERFACE(0:7))

113: WIRE EVENT FORMAT AFTER CONVERSION
(RADIO EXTENSION INTERFACE(007)→MAIN CONTROL MEANS(004))

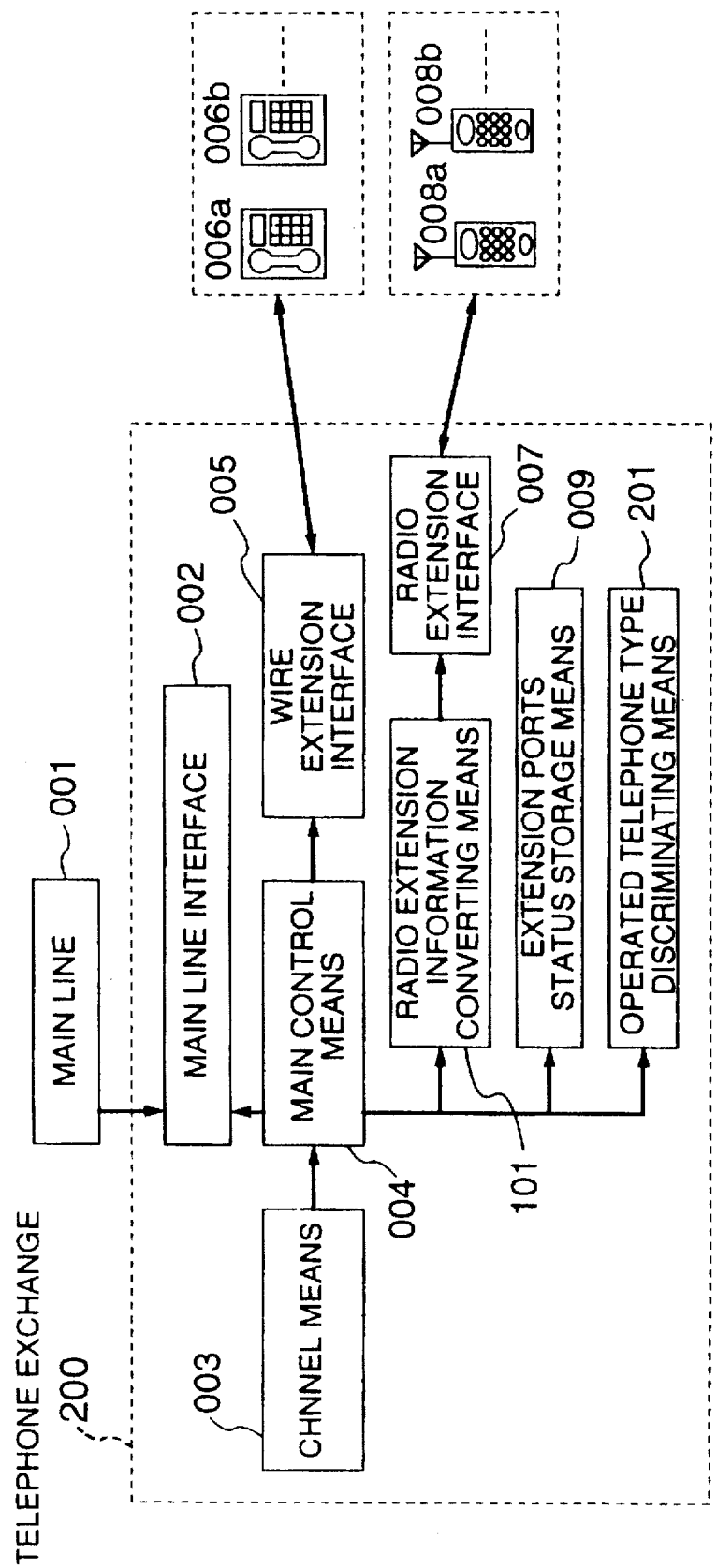

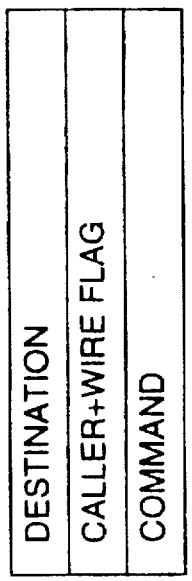

FIG.8A

211: WIRE EVENT FORMAT
(WIRE TELEPHONE(006)→WIRE EXTENSION INTERFACE(005)→MAIN CONTROL MEANS(004))

TELEPHONE TYPE FLAG

DESTINATION
CALLER+WIRE FLAG
COMMAND

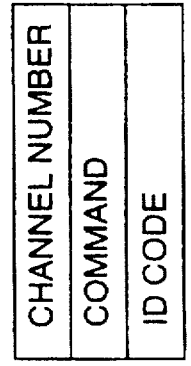

FIG.8B

212: RADIO EVENT FORMAT
(RADIO TELEPHONE(008)→RADIO EXTENSION INTERFACE(007))

CHANNEL NUMBER
COMMAND
ID CODE

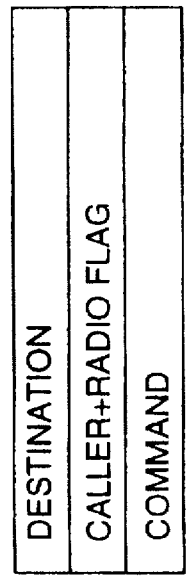

FIG.8C

213: RADIO EVENT FORMAT AFTER CONVERSION
(RADIO EXTENSION INTERFACE(007)→MAIN CONTROL MEANS(004))

TELEPHONE TYPE FLAG

DESTINATION
CALLER+RADIO FLAG
COMMAND

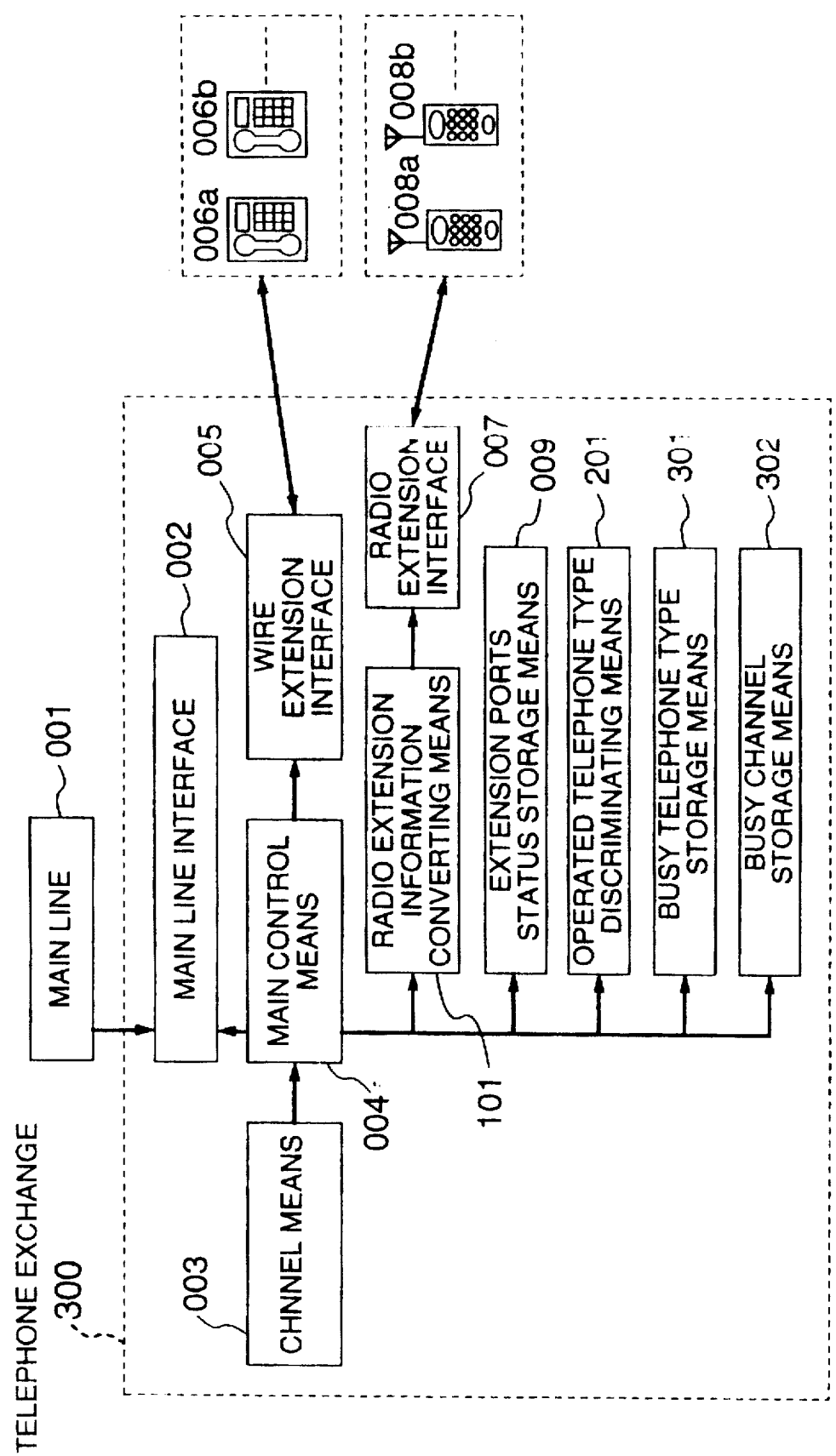

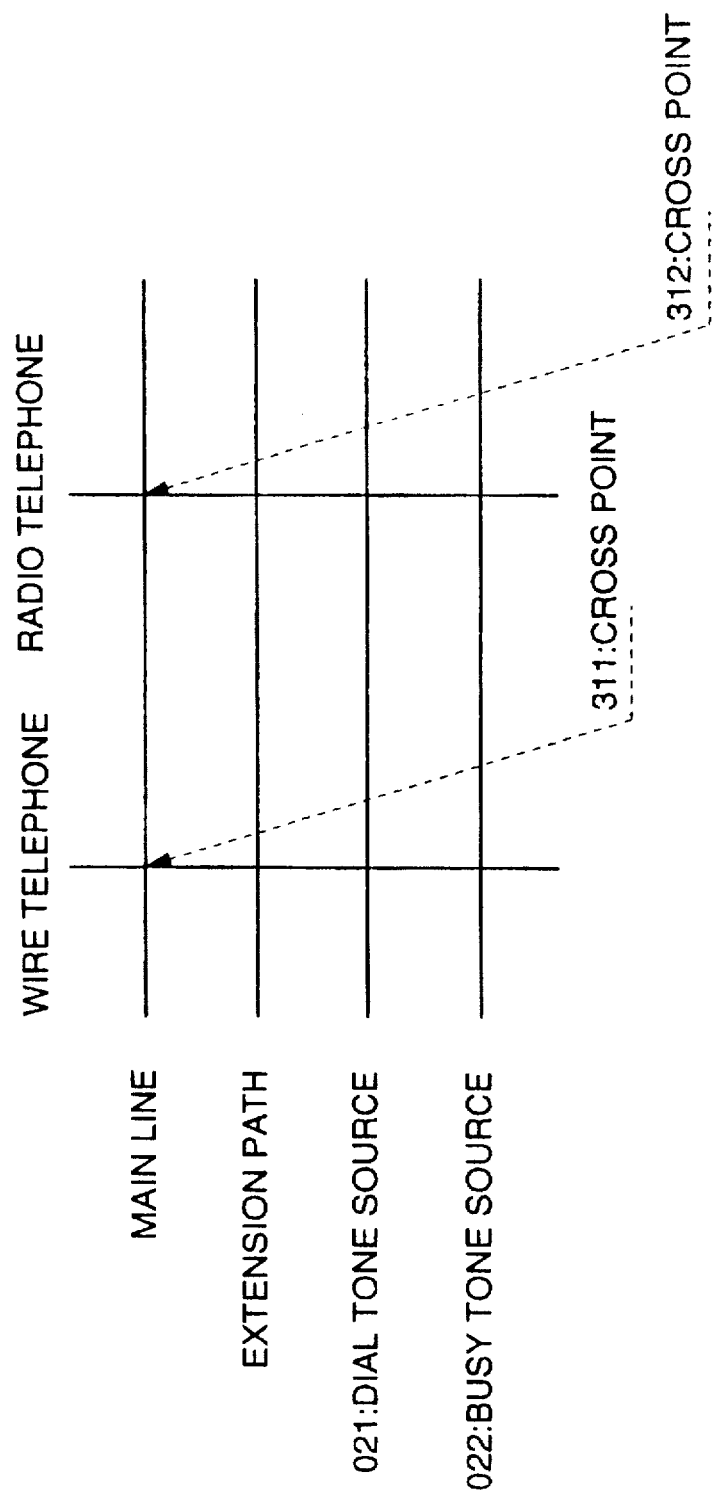

| NORMAL EXTENSION CALL DIAL NUMBER | PARALLEL CONNECTION EXTENSION CALL DIAL NUMBER |
|---|---|
| 11 | 111(FOR CALLING WIRE TELEPHONE) <br> 112(FOR CALLING RADIO TELEPHONE) |

TELEPHONE EXCHANGE FOR WIRE TELEPHONE AND RADIO TELEPHONE

BACKGROUND OF THE INVENTION

This invention relates to a telephone exchange. In recent years, telephone exchanges having radio communication equipment have been developed and installed in the premises of, for example, companies or enterprises. In these exchanges, portable radiotelephones in addition to wire telephones can be registered and used as extension telephones.

These radiotelephones include ones capable of communicating only through the private exchange provided within the associated enterprise and ones which have the functions of not only access to their own PBX, but also access to the base unit of the home cordless telephone system and to the external base station.

In the future, it will be supposed that a firm loans radiotelephones to the employees individually and that the number of such workers who always individually carry a radiotelephone with them is increased. If radiotelephones are loaned to employees by a company for private use as well as for their job, the workers can always carry the radiotelephones with them not only for their jobs but also for private time.

However, when radiotelephones are lent to a large number of employees by a firm, a great number of radiotelephones are registered as extension terminals in the PBX within the company, and extension dial numbers are assigned to the terminals. Since the extension dial numbers are also respectively allotted to the wire telephones placed on the disks, it is necessary that numerous extension dial numbers be managed in the PBX. In addition, if the dial numbers of the extension wire telephones placed on the disks are different from those of the radiotelephones used by the same employees, calling between the workers will be disturbed by the two different numbers given to each worker.

When the two wire telephone and radiotelephone are given to each of the employees, it is desirable to use the wire telephone when sitting at their disk and use the radiotelephone when leaving their desk. However, in the prior art, when a worker wants to leave the desk and move to another room while speaking over the wire telephone, it is necessary that a key on the wire telephone be operated to transfer and that the extension number of the radiotelephone be dialed.

SUMMARY OF THE INVENTION

In view of the above prior art, this invention provides a telephone exchange capable of easily operating any one of the juxtaposed and registered radiotelephone and wire telephone by only specifying one extension dial number, for example, individually calling the radiotelephone and the wire telephone or transferring a call from one telephone to the other without again supplying the extension dial number.

Thus, in a telephone exchange of the invention, there are provided extension ports status storage means having a table for juxtaposing and registering the physical numbers of the extension ports for wire telephones in association with the physical numbers of the extension ports for radiotelephones, and control means for controlling such that when one of one-type telephone extension ports of the juxtaposed radiotelephone extension ports and wire telephone extension ports is operated by supplying a certain extension dial number, the other associated one can also be operated without supplying another extension dial number. Therefore, both the juxtaposed and registered wire telephone and radiotelephone can be operated by only specifying one extension dial number.

Moreover, in addition to the above extension ports status storage means, there are provided operated telephone type discriminating means for deciding what type of telephone is connected to an extension port, and control means for controlling such that when one of the juxtaposed and registered telephones is tried to operate during the operation of the other one, the other telephone can notify the one telephone of its operation. Therefore, when one of the juxtaposed and registered wire telephone and radiotelephone is tried to operate during the operation of the other one, the other telephone can notify the one telephone of its operation.

Also, in addition to the above extension ports status storage means, there are provided busy telephone type storage means for storing which telephone is in the off-hook state when the wire telephone or radiotelephone connected to an extension port is in the off-hook state, busy channel storage means for storing a channel which an extension telephone uses, and control means for controlling such that when one of the juxtaposed extension telephone and radiotelephone is tried to operate during the operation of the other telephone, the one telephone can interrupt the talking channel of the other telephone, and that in the later telephone conversation, even if the one telephone is in the on-hook state, the telephone conversation can be maintained as long as the other telephone is in the off-hook state. Therefore, if one of the juxtaposed and registered wire telephone and radiotelephone is tried to operate even during the operation of the other one, it can interrupt the talking channel of the other telephone, and in the later telephone conversation, even if one of those telephones is made in the on-hook state, the talking channel can be maintained as long as the other telephone is in the off-hook state.

Moreover, in addition to the extension ports status storage means, there are provided simultaneous call setting means for storing whether simultaneous calling is made or not when the called telephone is juxtaposed and registered in association with the other associated telephone, and control means for controlling such that when one of the juxtaposed and registered ports is called, and if simultaneous calling is set in the simultaneous call setting means, both the wire telephone and radiotelephone at the associated ports can be called at a time. Therefore, the juxtaposed and registered wire telephone and radiotelephone at the associated ports can be simultaneously called.

Furthermore, in addition to the extension ports status storage means, there are provided called telephone type discriminating means for deciding whether the called telephone is wire type or radio type, and control means for controlling such that when one of the juxtaposed and registered extension wire telephone and radiotelephone is called, the wire telephone or radiotelephone can be individually called in accordance with the called telephone type discriminating means. Therefore, the juxtaposed wire telephone and radiotelephone at the associated ports can be individually called.

BRIEF DESCRIPTION OF THE DRAWINGS

FIG. 2 shows a table of extension physical numbers and associated extension dial numbers in the telephone exchange of embodiment 1 of the invention.

FIG. 3 shows a table of juxtaposed and registered radio extension physical numbers and wire extension physical numbers in the telephone exchange of embodiment 1 of the invention.

FIG. 4 is a control function block diagram of the telephone exchange of embodiment 1 of the invention.

FIG. 7 is a control function block diagram of a telephone exchange of embodiment 2 of the invention.

FIG. 8A, FIG. 8B and FIG. 8C show each event format of telephone information in the telephone exchange of embodiment 2 of the invention.

FIG. 10 is a control function block diagram of a telephone exchange of embodiment 3 of the invention.

FIG. 11 is a connection diagram of channel means in the telephone exchange of embodiment 3 of the invention.

DESCRIPTION OF THE PREFERRED EMBODIMENTS

Embodiments of the invention will hereinafter be described with reference to the accompanying drawings.

(Embodiment 1)

Figure 1:
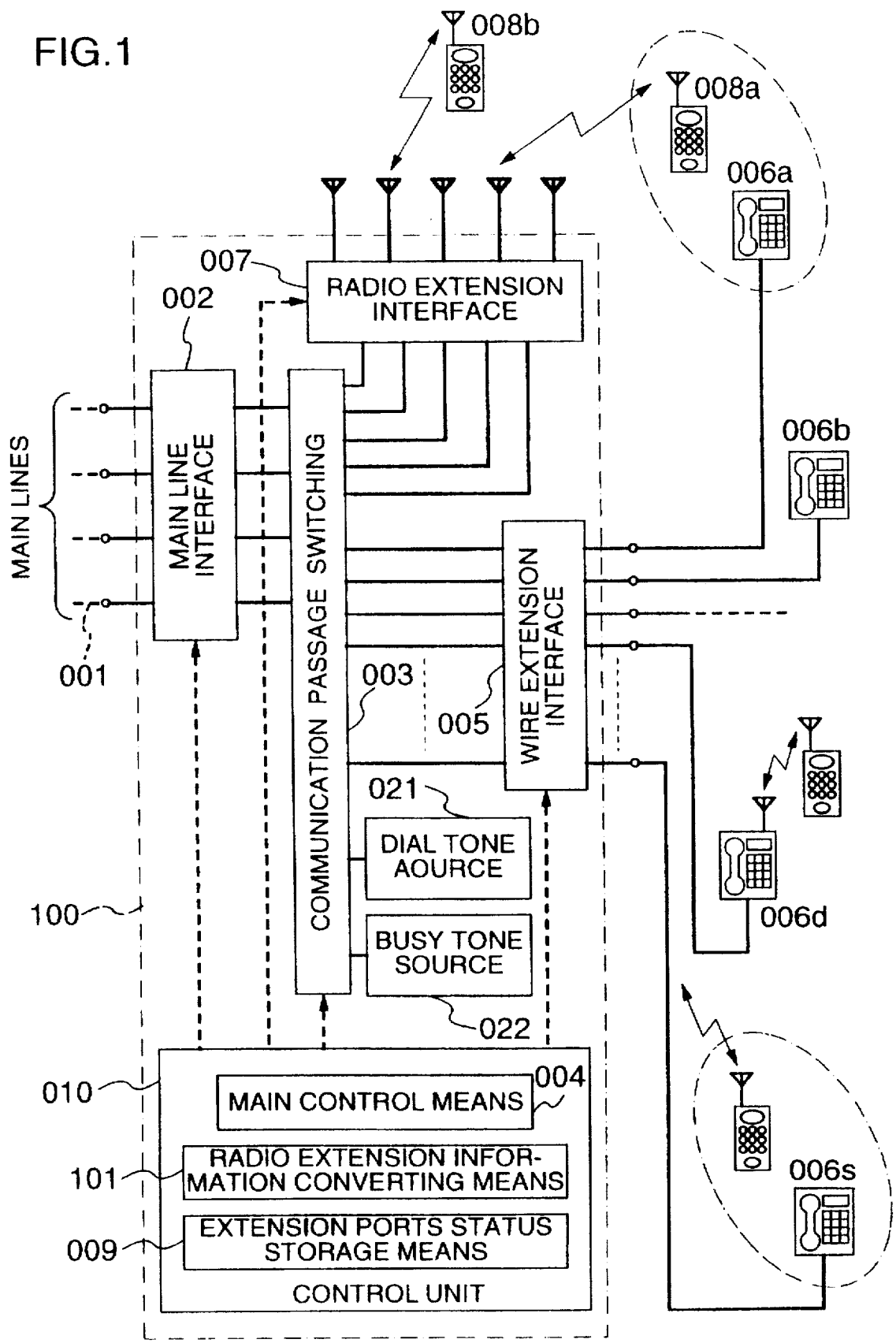
FIG. 1 is a block diagram of a telephone exchange of embodiment 1 of the invention.

FIG. 1 is a block diagram of the telephone exchange of embodiment 1 of the invention. Referring to FIG. 1, reference numeral 100 represents the telephone exchange of embodiment 1 of the invention which is installed in, for example, a company or enterprise. Shown at 006a, 006b, . . . are wire telephones which are connected to the wire extension ports of the telephone exchange 100, and at 008a, 008b, . . . are radiotelephones which let the users communicate by wireless through the radio extension ports of the telephone exchange 100. The radiotelephones 008a, 008b, . . . in this embodiment are used not only exclusively for the telephone exchange 100 but also for the access to, for example, the base unit of a home cordless telephone system and the external public base stations.

The telephone exchange 100 also includes a main wire interface 002 for main wires 001, a wire extension interface 005 for the wire telephones 006a, 006b, . . . , a radio extension interface 007 for the radiotelephones 008a, 008b, . . . , and communication passage switching means 003 for making speech channels between the extension telephones or between the main lines and the extension telephones. In addition, shown at 021 is a dial tone source for generating a dial tone signal, and at 022 is a busy tone source for generating a busy tone signal.

Also, there is shown a control unit 010, which analyzes the information transmitted through the wire extension interface 005, the radio extension interface 007 and the main line interface 002, and controls each portion of the telephone exchange.

FIG. 4 shows the construction and control flow of the control unit 010 in this embodiment. Referring to FIG. 4, there is shown a radio extension information converting means 101 for converting the information sent from the radio extension interface 007 into wire telephone information. There is also shown extension ports status storage means 009 for storing the state of the extension ports. The control unit 010 of this embodiment includes the extension ports status storage means 009 and the radio extension information converting means 101 as described above.

The extension dial numbers are respectively registered in association with the extension physical numbers of the extension telephones. FIG. 2 shows an example of the table (first table) of the extension physical numbers and the associated extension dial numbers. This table is stored in the extension ports status storage means 009. In this table, the extension ports #000 . . . #015 are the ports for the radiotelephones, and the extension ports #016 . . . #024 are the ports for the wire telephones. As, for example, shown in FIG. 2, an extension dial number "301" is registered at the extension port #000 for radiotelephone, and an extension dial number "302" at the extension port #001 for radiotelephone. In addition, an extension dial number "402" is registered at the extension port #016 for wire telephone.

In addition, the extension ports status storage means 009 has stored therein a juxtaposition registration table (second table) for registering the physical numbers of extension ports for wire telephones in association with the physical numbers of extension ports for radio telephones as shown in FIG. 3. When two separate radiotelephone and wire telephone are juxtaposed, the wire telephone extension physical number to be juxtaposed is written in association with the radiotelephone extension physical number. As, for example, shown in FIG. 3, the extension physical number #016 for wire telephone is written in association with the extension physical number #000 for radiotelephone, so that the radiotelephone of extension port #000 and the wire telephone of extension port #016 are juxtaposed and registered. Therefore, this extension ports status storage means 009 juxtaposes and registers one of a plurality of wire telephones 006a, 006b, . . . and one of a plurality of radiotelephones 008a, 008b, . . . in one extension port, so that either one of the juxtaposed telephones can be operated by specifying either one of the extension dial numbers.

The extension ports status storage means 009 can also store information on the current state of each extension port, or of whether the receiver of each telephone is hung up (on-hook state) or removed from the hook (off-hook state).

Figure 6:
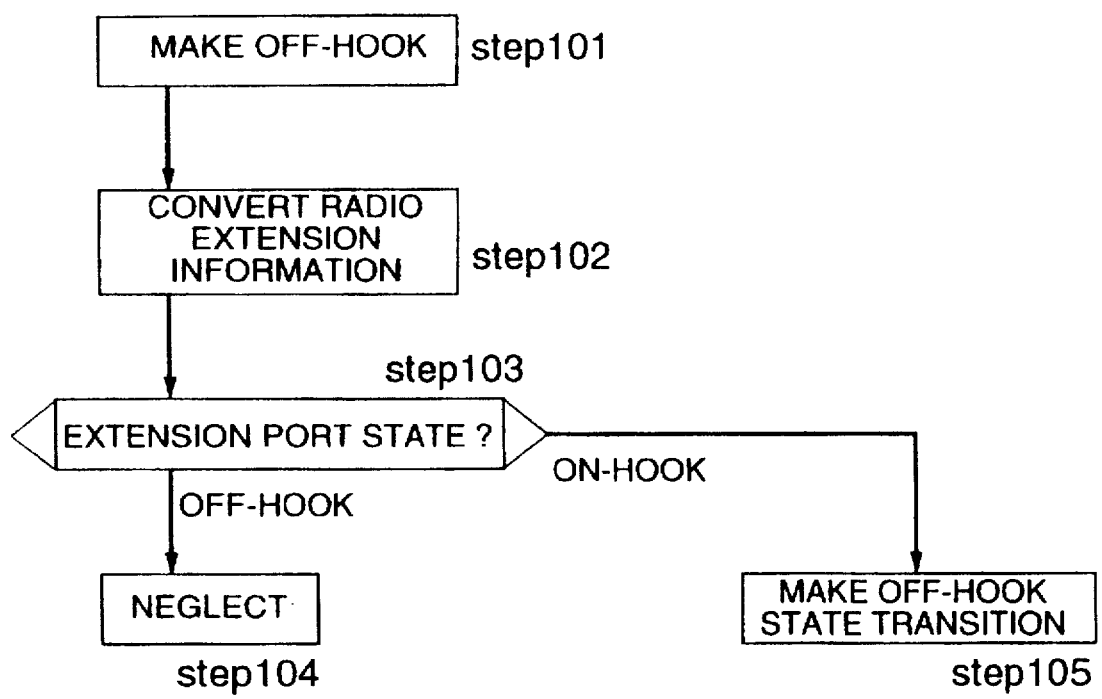
FIG. 6 is a flowchart showing the operation of the telephone exchange of embodiment 1 of the invention.

FIG. 6 is a flowchart showing the operation of the telephone exchange of this embodiment when one of the telephones at any one of the juxtaposed and registered extension ports is made in the off-hook state.

Referring to FIGS. 4 and 6, when the wire telephone 006a at the corresponding juxtaposed and registered extension port is put in the off-hook state (step 101 in FIG. 6), the off-hook information from the wire telephone 006a is transmitted through the wire extension interface 005 and the channel means to main control means 004. The main control means 004 checks the current state of the associated extension ports in the extension ports status storage means 009 (step 103). If the state of the corresponding extension ports have so far been in the on-hook state, the normal off-hook state transition processing (step 105) is executed. At this step, the wire telephone 006a is controlled to enter into the off-hook state through the wire extension interface 005, and further the channel means 003 connects the points for coupling the wire telephone 006a and the dial tone source 021 under the control of the main control means 004. Moreover, the extension ports status storage means 009 stores the information indicating that the corresponding extension ports have been made in the off-hook state.

If the associated extension ports are already in the off-hook state (the other telephone, or radiotelephone 008a at the juxtaposed and registered extension ports is in the off-hook state), the wire telephone off-hook information is neglected (step 104).

When the other telephone, or radiotelephone 008a at the corresponding juxtaposed and registered extension ports is made in the off-hook state (step 101), the off-hook information from the radiotelephone 008a is transmitted through the radio extension interface 007 and the channel means 003 to the main control means 004. At this time, the radio extension information converting means 101 converts the radiotelephone off-hook information into information of the same format as that sent from the wire telephone 006a (step 102).

Figure 5A:
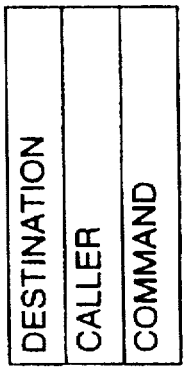
FIG. 5A, FIG. 5B and FIG. 5C show each event format of telephone information in the telephone exchange of embodiment 1 of the invention.
Figure 5B:
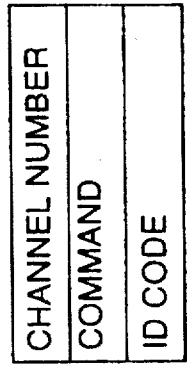
Figure 5C:
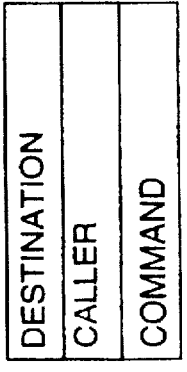

FIGS. 5A, 5B, 5C show each event format of telephone information. Referring to FIG. 5A, there are shown a wire event format 111 which is transmitted from the wire telephones 006a, 006b, ... through the wire extension interface 005 to the main control means 004, referring to FIG. 5B a radio event format 112 which is sent from the radiotelephones 008a, 008b, ... through the radio extension interface 007, and referring to FIG. 5C a converted radio event format 113 produced from the radio extension interface 007 and fed to the main control means 004.

Since the wire extension physical number #016 is written in association with the radio extension physical number #000 as shown in FIG. 3 so that the radiotelephone 008a at the extension port #000 and the wire telephone 006a at the extension port #016 are juxtaposed and registered, the radio event format 112 from the radiotelephone 008a is converted at step 102. Thus, the radio event format 112 is converted into the same format as the wire event format 111, or into the radio event format 113. Since the wire event format 111 is the same as the radio event format 113 after conversion, the main control means 004 receives and processes the off-hook information from the radiotelephone 008a as if it were sent from the wire telephone 006a, though the radiotelephone 008a is made in the off-hook state.

When the main control means receives and processes the off-hook information, it checks the current state of the extension ports in the extension ports status storage means 009 (step 103 in FIG. 6). If the corresponding extension ports have so far been in the on-hook state, the normal off-hook state transition processing is executed (step 105). At this step, the channel means 003 connects the points for coupling the radiotelephone 008a and the dial tone source 021 under the control of the main control means 004.

Then, the information indicating that the corresponding extension ports are now in the off-hook state since the radiotelephone has been made in the off-hook state is sent through the radio extension interface 007 to the extension ports status storage means 009, where it is stored. If the extension ports are already in the off-hook state (the wire telephone 006a at the juxtaposed and registered extension ports is in the off-hook state), the radiotelephone off-hook information is neglected (at step 104).

(Embodiment 2)

FIG. 7 is a control block diagram of a telephone exchange 200 of the embodiment 2 of the invention. The telephone exchange 200 of this embodiment is different from the telephone exchange 100 of the previous embodiment in that operated telephone type discriminating means 201 is added which detects the type of the operated telephone. In other words, the control unit 010 of this embodiment includes the extension ports status storage means 009, the radio extension information converting means 101 and the operated telephone type discriminating means 201. Since the other portions are substantially the same as in the telephone exchange 100 of embodiment 1, like elements corresponding to those are identified by the same reference numerals and will not be described in detail.

When one of the juxtaposed and registered wire telephone and radiotelephone is tried to be used by one operator while the other operator is already using the other telephone, the operated telephone type discriminating means 201 enables the other operator to notify the one operator that the other one has already been used by the other operator.

Figure 9:
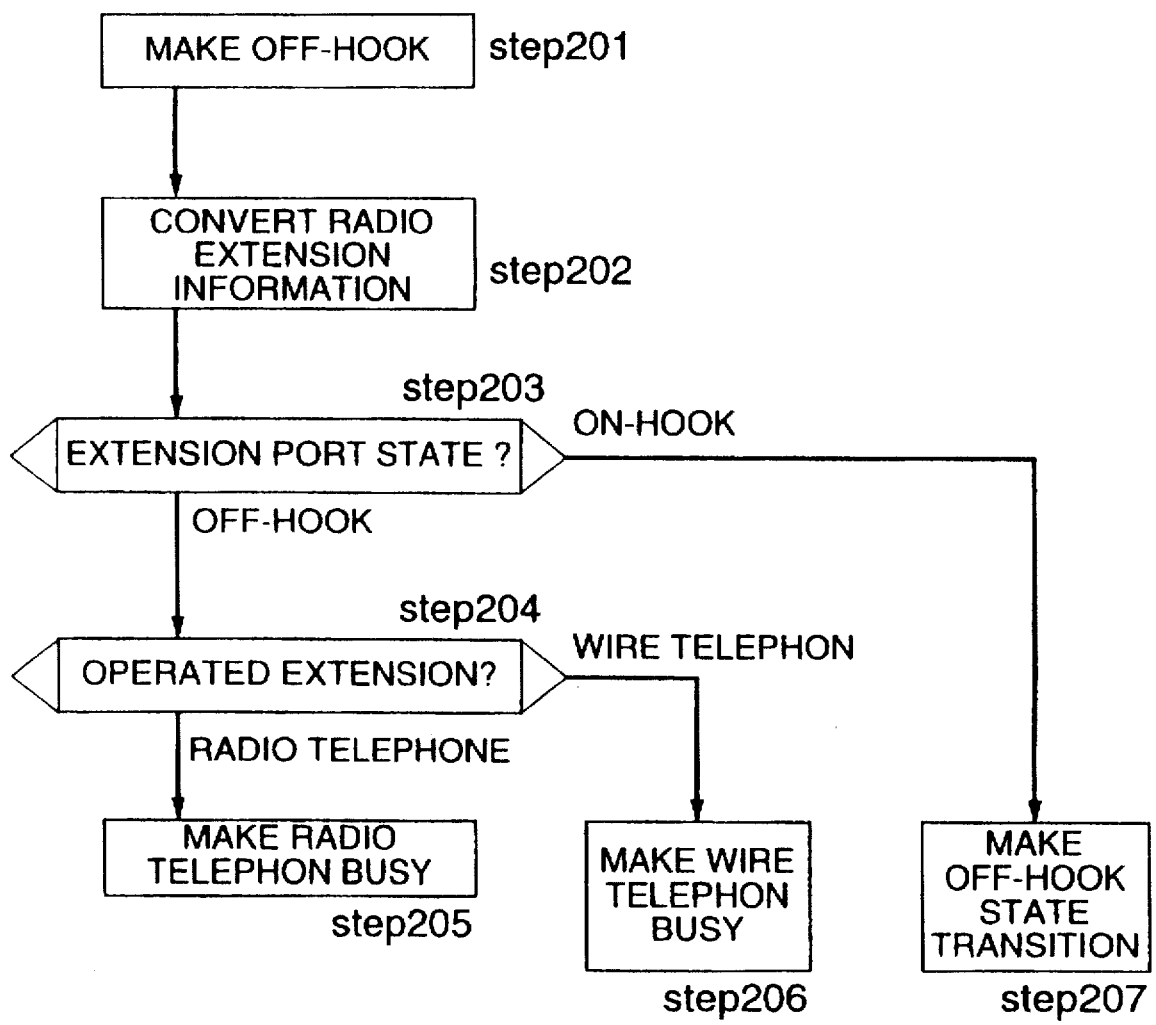
FIG. 9 is a flowchart showing the operation of the telephone exchange of embodiment 2 of the invention.

FIG. 9 is a flowchart showing the operation of the telephone exchange of this embodiment when one of the juxtaposed and registered extension telephones at the corresponding extension ports is made in the off-hook state.

Referring to FIGS. 7 and 9, when the wire telephone 006a of the juxtaposed and registered extension ports is made in the off-hook state (step 201 in FIG. 9), the off-hook information from the wire telephone 006a is transmitted through the wire extension interface 005 and the channel means to the main control means 004. The main control means 004 checks the current state of the associated extension ports in the extension ports status storage means 009 (step 203). If the corresponding extension ports have so far been in the on-hook state, the normal off-hook state transition processing (step 207) is executed. At step 207, the main control means 004 orders the channel means 003 to connect the points for coupling the wire telephone 006a and the dial tone source 021.

Then, the information indicating that the corresponding extension ports are now in the off-hook state since the wire telephone 006a has been made in the off-hook state is sent through the wire extension interface 005 to the extension ports status storage means 009, where it is stored.

At this time, if the corresponding extension ports are already in the off-hook state (the radiotelephone 008a of the juxtaposed and registered telephones is in the off-hook state), the operated telephone type discriminating means 201 checks the telephone type flag added to the extension telephone information, thus discriminating whether the above information has been transmitted from the wire telephone 006a or from the radiotelephone 008a (step 204).

Thereafter, the main control means 004 orders the channel means 003 to connect the points for coupling the wire telephone 006a and the busy tone source 022. Then, the busy tone is sent to the wire telephone through the wire extension interface 005 (step 206), and the busy tone received state is stored in the extension ports status storage means 009.

FIGS. 8A, 8B, 8C show each event format of telephone information. The operated telephone type is discriminated by, firstly, assigning one of telephone flags to a caller who uses the wire event format (211) or the converted radio event format (213) in FIG. 8, and then checking the one of the telephone flags by the main control means (004).

When the radiotelephone 008a of the juxtaposed and registered telephones at the corresponding extension ports is made in the off-hook state (step 201 in FIG. 9), the off-hook information from the radiotelephone 008a is transmitted through the radio extension interface 007 and the channel means to the main control means 004. The main control means 004 checks the current state of the extension ports in the extension ports status storage means 009 (step 203). If the corresponding extension ports have so far been in the on-hook state, the normal off-hook state transition processing (step 207) is executed. At step 207, the main control means 004 orders the channel means 003 to connect the points for coupling the wire telephone 006a and the dial tone source 021.

Then, the information indicating that the corresponding extension ports are now in the off-hook state since the radiotelephone 008a has been made in the off-hook state is transmitted through the radio extension interface 007 to the extension ports status storage mean 009, where it is stored.

At this time, if the corresponding extension ports are already in the off-hook state (the wire telephone 006a of the juxtaposed and registered telephones is in the off-hook state), the operated telephone type discriminating means 201 checks the telephone type flag added to the extension telephone information, thus discriminating whether the above information has been transmitted from the wire telephone 006a or from the radiotelephone 008a (step 204).

Then, the main control means 004 orders the channel means 003 to connect the points for coupling the radiotelephone 008a and the busy tone source 022. Thereafter, the busy tone is sent to the radiotelephone through the radio extension interface 007 (step 205), and the busy tone received state is stored in the extension ports status storage means 009.

Thus, when one of the juxtaposed and registered extension telephones at the corresponding ports is made in the off-hook state while the other one is already used, the busy information can be displayed on the one telephone.

(Embodiment 3)

FIG. 10 is a control function block diagram of a telephone exchange 300 of embodiment 3 of the invention. The telephone exchange 300 of this embodiment is different from the telephone exchange 200 of the previous embodiment in that it has additionally a busy telephone type storage means 301 that stores which telephone is in the off-hook state when the extension ports of the juxtaposed wire telephone 006 and radiotelephones 008a, 008b, ...) are in the off-hook state, and a busy channel storage means 302 that stores the channel which the off-hook telephone uses. In other words, the control unit 010 of this embodiment includes the extension ports status storage means 009, the radio extension information converting means 101, the operated telephone type discriminating means 201, the busy telephone type storage means 301 and the busy channel storage means 302. Since the other portions are substantially the same as in the telephone exchanges of the previous embodiments, like elements corresponding to those are identified by the same reference numerals, and will not be described in detail.

The additionally provided busy telephone type storage means 301 and busy channel storage means 302 make it possible that when one of the juxtaposed and registered wire telephone 006a and radiotelephone 008a is tried to operate while the other one is already used, it can interrupt the telephone conversation. Even if any one of the juxtaposed and registered telephones is made in the on-hook state during the later conversation, the conversation can be maintained as long as the other telephone is in the off-hook state.

Figure 12A:
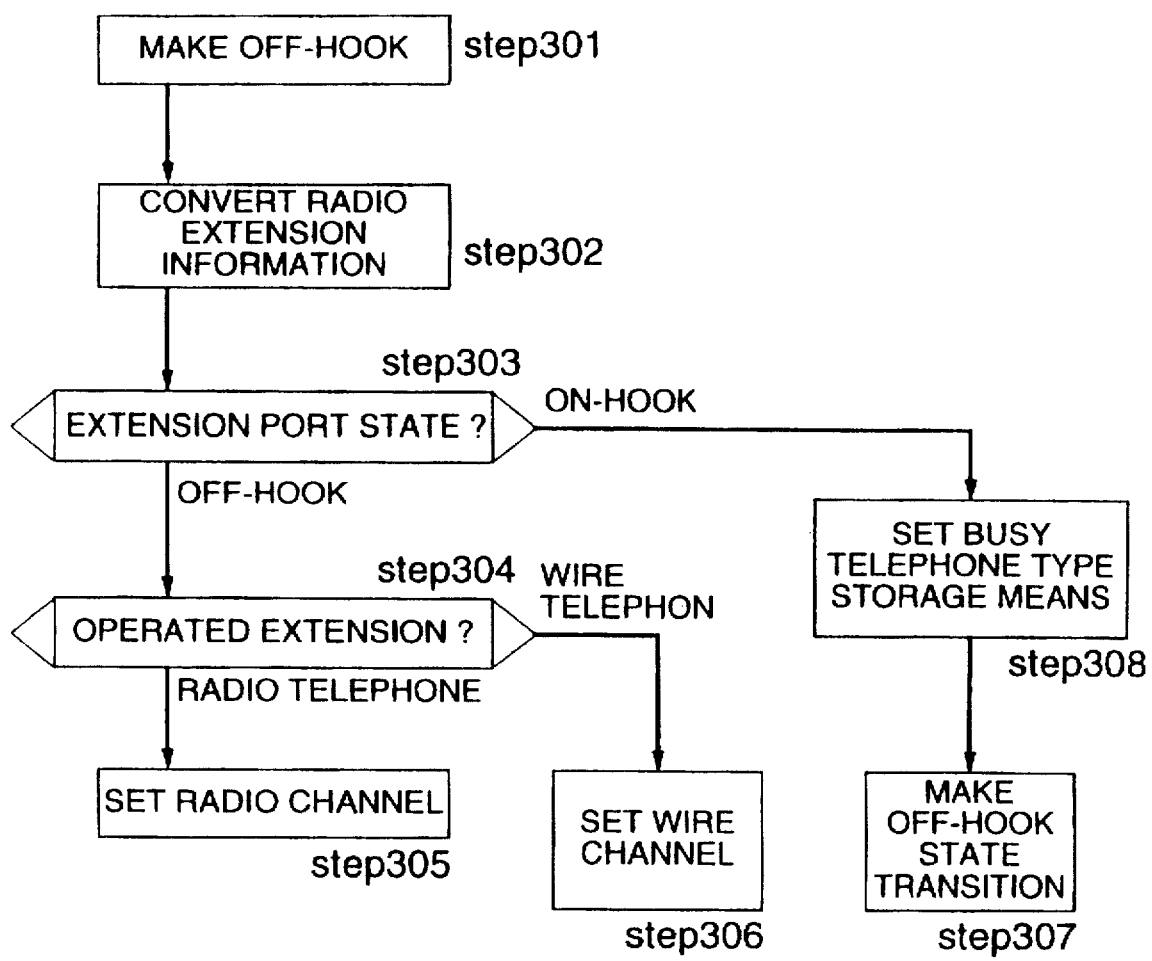
FIG. 12A and FIG. 12B are a flowchart showing the operation of the telephone exchange of embodiment 3 of the invention.
Figure 12B:
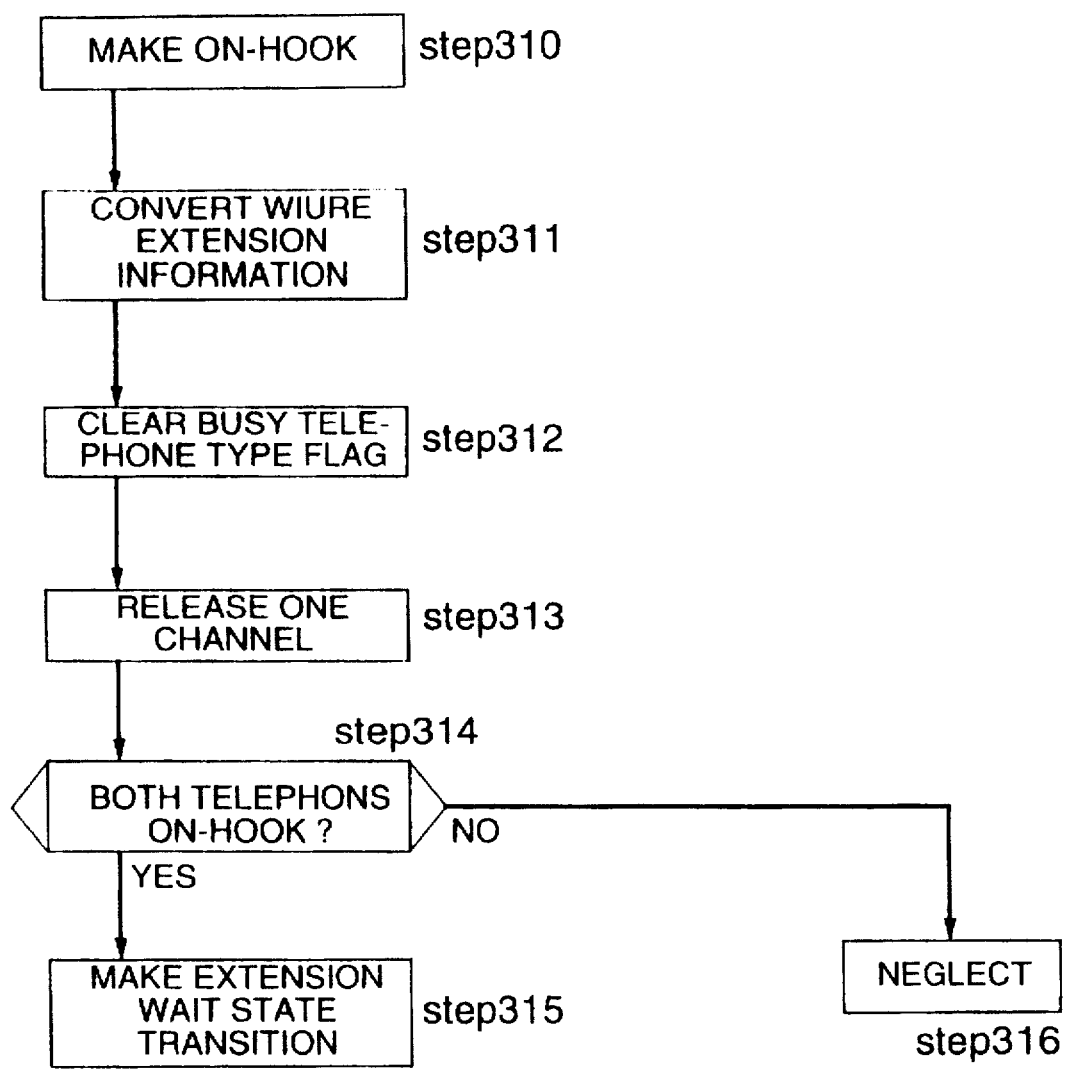

FIG. 12A is a flowchart for interrupting the conversation when the other telephone is already used. FIG. 12B is a flowchart for disconnecting the talking channel only when both extension telephones are made in the on-hook state.

Referring to FIG. 10 and FIGS. 12A and 12B, when the wire telephone 006a of the juxtaposed and registered telephones at the corresponding extension ports is made in the off-hook state (step 301 in FIG. 12A), the off-hook information from the wire telephone 006a is transmitted through the wire extension interface 005 and the channel means to the main control means 004. The main control means 004 checks the current state of the extension ports in the extension ports status storage means 009 (step 303). If the corresponding extension ports have so far been in the on-hook state, the wire telephone flag is set in the busy telephone type storage means 301 (step 308), and the normal off-hook state transition processing (step 307) is executed. At step 307, the main control means 004 orders the channel means 003 to connect the points for coupling the wire telephone 006a and the dial tone source 021.

Then, the information indicating that the corresponding extension ports are now in the off-hook state since the wire telephone 006a has been made in the off-hook state is sent through the wire extension interface 005 to the extension ports status storage means 009, where it is stored. If the extension ports are already in the off-hook state (the radiotelephone 008a of the juxtaposed and registered telephones is in the off-hook state), the operated telephone type discriminating means 201 checks the telephone type flag added to the extension telephone information, thus discriminating whether the information has been transmitted from the wire telephone 006a or from the radiotelephone 008a (step 304).

The main control means 004 orders the channel means 003 to connect the wire telephone 006a to the channel which is stored in the busy channel storage means 302 and which the radiotelephone 008a uses. As, for example, shown in the channel means connection diagram 310 of FIG. 11, when the radiotelephone 008a is connected to a main line, a cross point 312 is turned on. At this time, when the wire telephone 006a is made in the off-hook state, a cross point 311 is turned on, and as a result the radiotelephone 008a and wire telephone 006a are connected to the main line 001.

Then, the information indicating that the corresponding extension ports are in the off-hook state since the wire telephone has been made in the off-hook state (step 301 in FIG. 12A) is transmitted through the wire extension interface 005 to the extension ports status storage means 009, where it is stored. When the wire telephone 006a in the off-hook state is made in the on-hook state (step 310 in FIG. 12B, the wire telephone type flag of the busy telephone type storage means 301 is cleared (step 312). The main control means 004 orders the channel means 003 to release only the channel which the wire telephone 006a has so far used (step 313).

Thereafter, the busy telephone type storage means 301 is checked so that it is confirmed that both the juxtaposed and registered ports are in the on-hook state (step 314). If both ports are not in the on-hook state, nothing is made (step 316). If both ports are in the on-hook state, the main control means 004 controls the wire telephone 006a to shift to the on-hook state (step 315) through the wire extension interface 005, and the on-hook state is stored in the extension port status storage means 009.

When the radiotelephone 008a of the juxtaposed and registered telephones at the corresponding ports is made in the off-hook state (step 301 in FIG. 12A), the off-hook information from the radiotelephone 008a is sent through the radio extension interface 007 and the channel means to the main control means 004. The main control means 004 checks the current state of the extension ports in the extension ports status storage means 009 (step 303). If the corresponding ports have so far been in the on-hook state, the radiotelephone flag is set in the busy telephone type storage means 301 (step 308), and the normal off-hook state transition processing is executed (step 307). At this step, the main control means 004 controls the channel means 003 to connect the points for coupling the radiotelephone 008a and the dial tone source 021.

Then, the information indicating that the corresponding extension ports are now in the off-hook state since the radiotelephone 008a has been made in the off-hook state is transmitted through the radio extension interface 007 to the extension ports status storage means 009, where it is stored. If the extension ports are already in the off-hook state (the wire telephone 006a of the juxtaposed and registered telephones is in the off-hook state), the operated telephone type discriminating means 201 checks the telephone type flag added to the extension telephone information, thus discriminating whether the above information has come from the wire telephone 006a or from the radiotelephone 008a (step 304). Thereafter, the main control means 004 controls the channel means 003 to connect the radiotelephone 008a and the channel which is stored in the busy channel storage means 302 and which the wire telephone 006a has used so far.

Then, the information indicating that the corresponding extension ports are now in the off-hook state since the radio telephone has been made in the off-hook state is transmitted through the radio extension interface 007 to the extension ports status storage means 009, where it is stored. When the radiotelephone 008a, 008b, ... in the off-hook state is made in the on-hook state (step 310 in FIG. 12B), the radiotelephone type flag of the busy telephone type storage means 301 is cleared (step 312), and the main control means 004 orders the channel means 003 to release only the channel which the radiotelephone 008a, 008b, ... has used so far (step 313).

Thereafter, the busy telephone type storage means 301 is checked so that it is confirmed that both the juxtaposed and registered extension ports are in the on-hook state (step 314 in FIG. 12B). If both extension ports are not in the on-hook state, nothing is made (step 316). If both extension ports are in the on-hook state, the main control circuit 004 controls the radiotelephone 008a, 008b, ... to be shifted to the on-hook state through the radio extension interface 007 (step 315), and the on-hook state is stored in the extension port status storage means 009.

Thus, when one of the juxtaposed and registered extension telephones at the corresponding ports is made in the off-hook state while the other one of the juxtaposed and registered telephones is already used, it can also interrupt the talking channel which the other one has already established. Even if any one of the juxtaposed and registered telephones is made in the off-hook state during the later conversation, the talking channel can be maintained as long as the other one is in the off-hook state.

(Embodiment 4)

Figure 13:
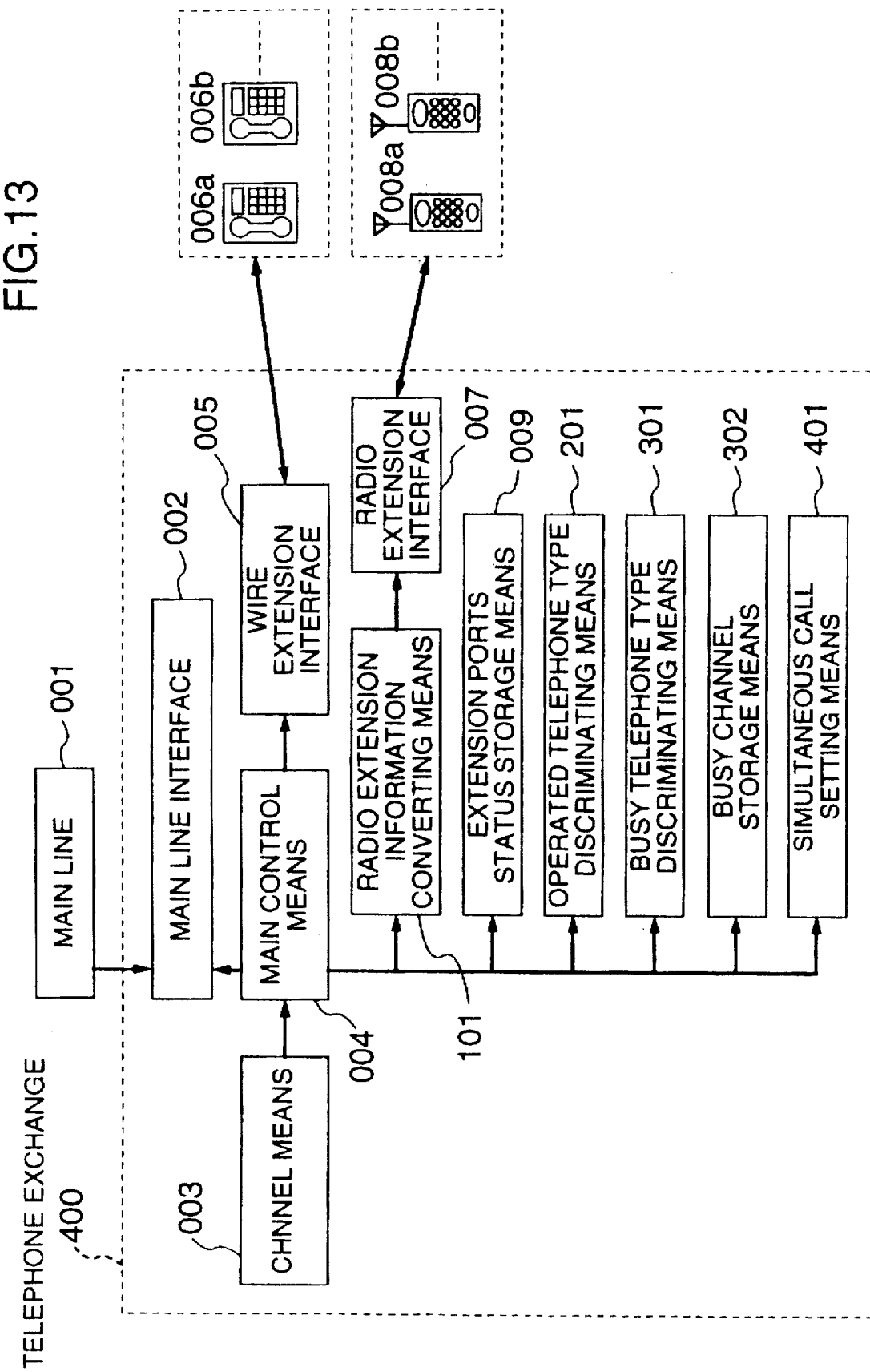
FIG. 13 is a control block diagram of a telephone exchange of embodiment 4 of the invention.

FIG. 13 is a control block diagram of a telephone exchange 400 of embodiment 4 of the invention. The telephone exchange 400 of this embodiment is different from the telephone exchange 300 of the previous embodiment in that simultaneous call setting means 401 is added in which it is stored whether simultaneous calling is made or not when the extension ports of the called subscriber are juxtaposed and registered. In other words, the control unit 010 of this embodiment includes the extension ports status storage means 009, the radio extension information converting means 101, the operated telephone type discriminating means 201, the busy telephone type storage means 301, the busy channel storage means 302 and the simultaneous call setting means 401. Since the other portions are substantially the same as in the telephone exchange of the previous embodiment, like elements corresponding to those are identified by the same reference numerals, and will not be described in detail.

Since the simultaneous call setting means 401 is provided, the following control operation can be made. When a call is received by one of the juxtaposed and registered wire telephone and radiotelephone and if the simultaneous calling to the corresponding extension ports is previously set in the simultaneous call setting means 401, the call signal is also sent to the other telephone. Thus, both the juxtaposed and registered wire telephone and radiotelephone can be simultaneously called.

Figure 14:
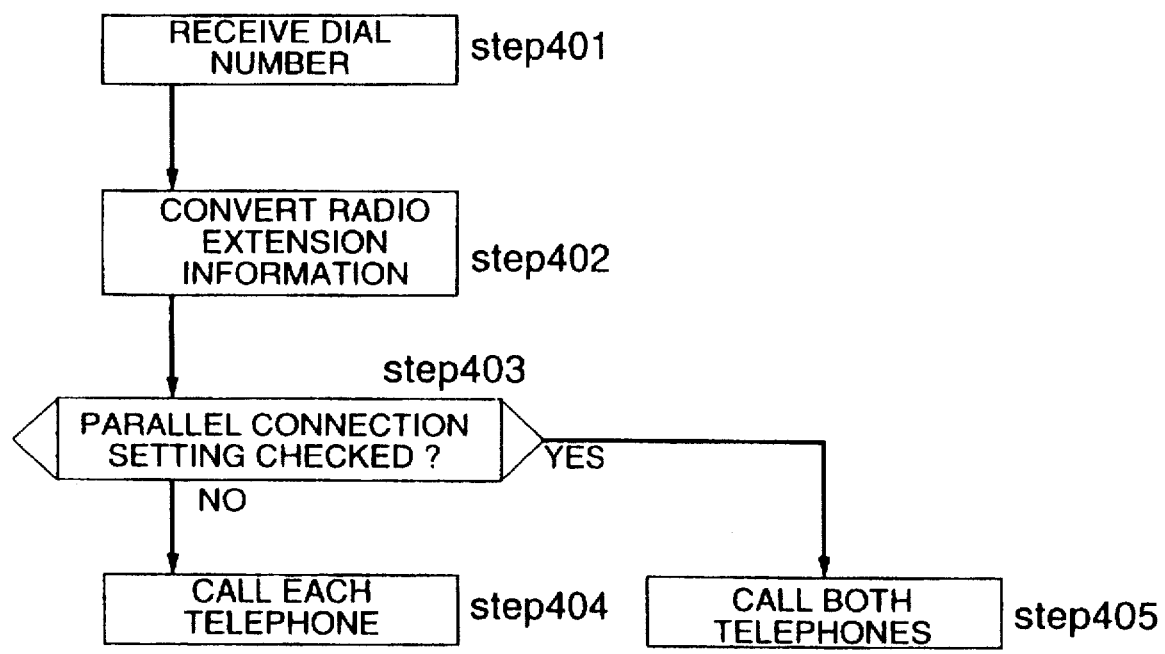
FIG. 14 is a flowchart showing the operation of the telephone exchange of embodiment 4 of the invention.

FIG. 14 is a flowchart for simultaneously calling both wire telephone and radiotelephone at the juxtaposed and registered extension ports.

Referring to FIGS. 13 and 14, when the wire telephone 006a of the juxtaposed and registered extension ports calls the radiotelephone 008a of the same extension ports by dialing (step 401 in FIG. 14), the information of the extension dial number from the wire telephone 006a is transmitted through the wire extension interface 005 and the channel means to the main control means 004. The main control means 004 finds the extension port by checking the table of FIG. 2 with the extension dial number, and the presence or absence of the juxtaposition registration to the obtained extension port is decided from the juxtaposition registration table of FIG. 3 (step 403).

If the called extension telephone is juxtaposed and registered with the other, decision is made of whether simultaneous call setting is made or not by the simultaneous call setting means 401. If the simultaneous call setting is already made, the main control means 004 controls the radiotelephone to be called through the radio extension interface 007 (step 405) and the wire telephone to be called through the wire extension interface 005 (step 405).

If the called extension telephone is not juxtaposed and registered with any one, the main control means 004 controls the radiotelephone to be called through the radio extension interface 007 (step 404) or the wire telephone to be called through the wire extension interface 005 (step 404).

The wire telephone 006a of the juxtaposed and registered extension telephones can call the other radiotelephone 008a of the same juxtaposed extension telephones and a talking circuit can be established between these juxtaposed and registered extension telephones. In other words, when the wire telephone 006a calls the other radiotelephone 008a of the same extension telephones by dialing (step 401), the main control means 004 decides whether the extension port found by checking the table with the extension dial number information is juxtaposed and registered or not from the juxtaposition registration table of FIG. 3. In this case, even if simultaneous call setting is made by the simultaneous call setting means 401, it is neglected, and only the radiotelephone 008a is called.

(Embodiment 5)

Figure 15:
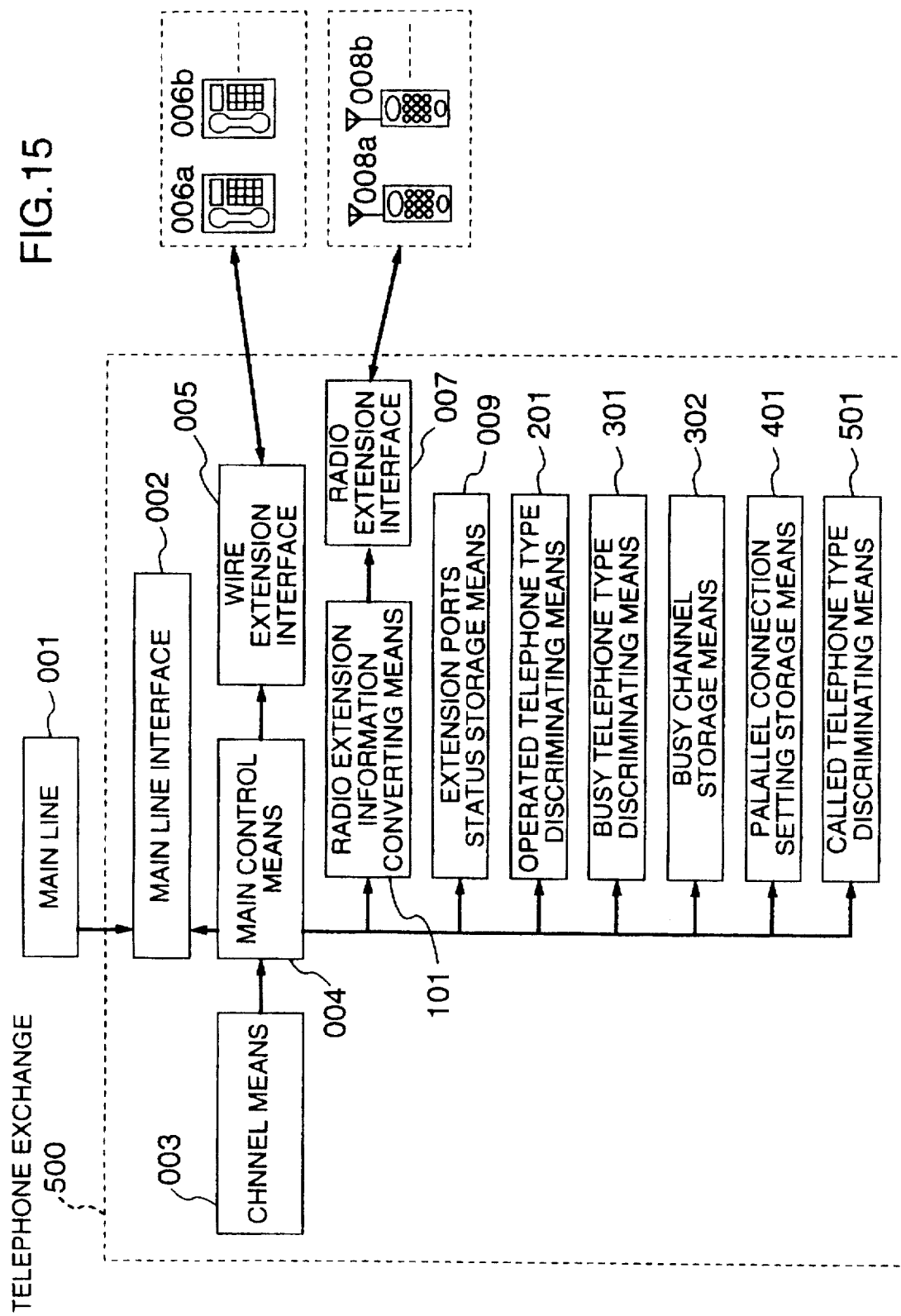
FIG. 15 is a control function block diagram of a telephone exchange of embodiment 5 of the invention.

FIG. 15 is a control function block diagram of a telephone exchange 500 of embodiment 5 of the invention. The telephone exchange 500 of this embodiment is different from the telephone exchange 400 of the previous embodiment in that a called telephone type discriminating means 501 is added for deciding whether the called telephone is wire telephone or radiotelephone. In other words, the control unit 010 of this embodiment includes the extension ports status storage means 009, the radio extension information converting means 101, the operated telephone type discriminating means 201, the busy telephone type storage means 301, the busy channel storage means 302, the simultaneous call setting means 401 and the called telephone type discriminating means 501. Since the other portions are substantially the same as in the telephone exchange of the previous embodiment, like elements corresponding to those are identified by the same reference numerals, and will not be described in detail.

Figures 16, 17:
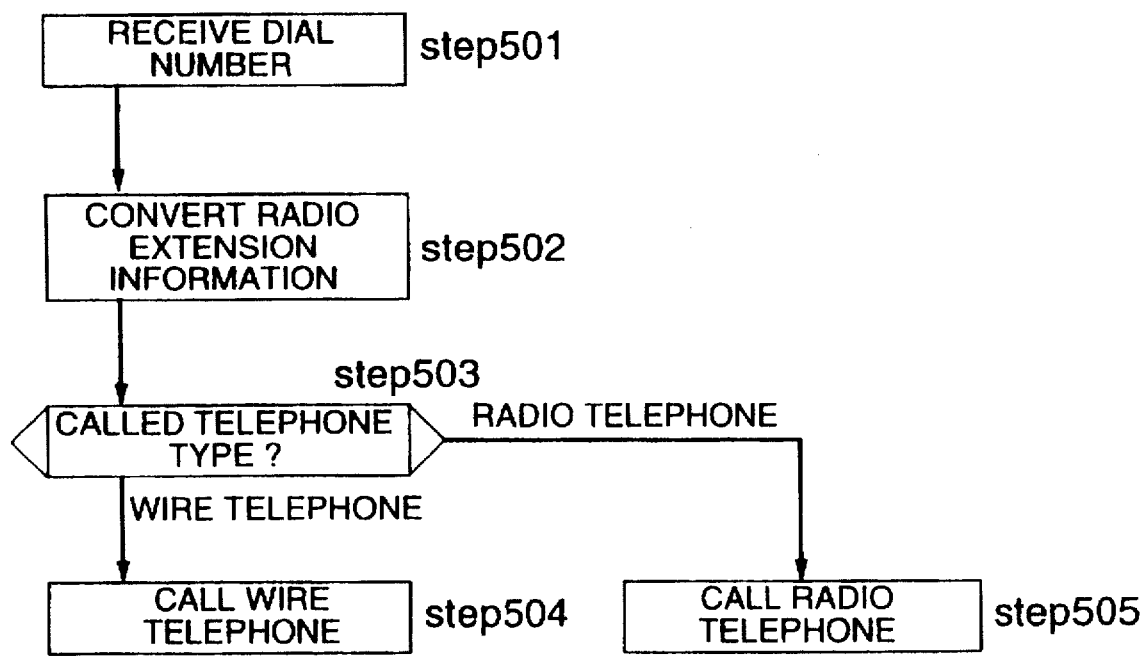
FIG. 16 shows one format of information set in called telephone type discriminating means in the telephone exchange of embodiment 5 of the invention.
FIG. 17 is a flowchart showing the operation of the telephone exchange of embodiment 5 of the invention.

The called telephone type discriminating means 501, as shown in FIG. 16, has previously registered herein an extension dial number for normal calling, and associated extension dial numbers for calling wire telephone and radiotelephone.

The extension dial number sent from a calling subscriber can be decided to be for the wire telephone or radiotelephone of the juxtaposed and registered wire telephone and radiotelephone by the called telephone type discriminating means 501. Thus, the wire telephone or radiotelephone of those extension ports can be individually called.

FIG. 17 is a flowchart for individually calling the wire telephone or radiotelephone of the juxtaposed and registered extension ports.

Referring to FIGS. 15 and 17, when the wire telephone 006a of the juxtaposed and registered extension ports calls the radiotelephone 008a of the same extension ports by dialing (step 501 in FIG. 17), the extension dial number information from the wire telephone 006a is transmitted through the wire extension interface 005 and the channel means to the main control means 004. The main control means 004 sends the extension dial number information to the called telephone type discriminating means 501, causing it to decide whether the called telephone is wire telephone or radiotelephone.

If the called telephone is radiotelephone, the main control means 004 makes the radiotelephone called through the radio extension interface 007 (step 505).

When the radiotelephone 008a of the juxtaposed and registered extension ports calls the wire telephone 006a of the same ports by dialing (step 501), the extension dial number information from the radiotelephone 008a is sent through the radio extension interface 007 to the main control means 004. The main control means 004 transmits the dial number information to the called telephone type discriminating means 501, forcing it to decide whether the called telephone is wire type or radio type. If the called telephone is decided to be wire telephone on the basis of the registration of FIG. 16, the main control means 004 makes the wire telephone called through the wire extension interface 005 (step 504).

As described above, the following operations can be performed by this invention. According to claim 1 of the invention, any one of the juxtaposed wire telephone and radiotelephone can be operated by only designating the extension dial number of one of those telephones. Thus, the user can operate the wire telephone when sitting at a desk, and operate the radiotelephone when leaving the desk. In addition, a boss can entrust his secretary with the switchboard operation using the wire telephone at a single extension port, while the boss can always receive by the radiotelephone only the important calls which are transferred from the secretary.

According to claim 2 of the invention, when one of the juxtaposed wire telephone and radiotelephone is tried to operate while the other one is being operated, the other telephone can notify the one telephone of its operation. Therefore, when one of the telephones is tried to operate during the operation of the other one, the user trying to operate the one telephone can instantly perceive the fact, and then stop the useless operation after hearing the busy tone.

According to claim 3 of the invention, when one of the juxtaposed and registered wire telephone and radiotelephone is tried to operate while the other one is being operated, it can interrupt the talking channel of the other telephone. In the later telephone conversation, even if one of the telephones is made in the on-hook state, the telephone conversation can be maintained as long as the other one is in the off-hook state. Therefore, when the user wants to use one of the juxtaposed and registered telephones at any cost for an urgent engagement, it can interrupt the telephone conversation even during the operation of the other telephone, and the user can request the other user that he want to use his own telephone for emergency. Moreover, the talking channel established for the radiotelephone of the juxtaposed and registered wire telephone and radiotelephone can be easily shifted, or the call can be easily transferred from the radiotelephone, to the wire telephone by only making the wire telephone in the off-hook state and then the radio telephone in the on-hook state.

According to claim 4 of the invention, both the juxtaposed wire telephone and radiotelephone at the corresponding extension ports can be called simultaneously. Therefore, even if it is not clear in which of either of two rooms a person to be called is, the two rooms can be called up at the same time by a caller dialing a telephone number once.

According to claim 5 of the invention, the juxtaposed wire telephone and radiotelephone at the corresponding extension port can be individually called up. Therefore, the extension telephones can be individually called up through a single extension port as if two ports were used for calling up two telephones.

What is claimed is:

1. A telephone exchange comprising:

a wire extension interface having a plurality of first extension ports for wire telephones;

a radio extension interface having a plurality of second extension ports for radiotelephones;

a main line interface for connecting main lines;

channel means for connecting or releasing channels between extensions or between extensions and main lines;

extension ports status storage means having a first table for storing dial numbers in association with physical numbers of said first extension ports and said second extension ports and a second table for juxtaposing and registering the physical numbers of said first extension ports in association with the physical numbers of said second extension ports; and control means for performing a control operation in which (a) a talking channel is connected when one of said first extension ports or one of said second extension ports that is juxtaposed and registered in said extension ports status storage means in association with said one of said first extension ports is put in an off-hook state and said talking channel can be maintained even if another one of said first extension ports or of said second extension ports is put in the off-hook state, and (b) when said one of said first extension ports or said one of said second extension ports is put in an on-hook state, said talking channel is transferred to said another one of said first extension ports or of said second extension ports which has been put in the off-hook state, without supplying the one of said dial numbers which is associated with said another one of said first extension ports or said second extension ports.

* * * * *